May 20, 1930.                L. MAMBOURG                1,759,235

SHEET GLASS APPARATUS

Filed Sept. 20, 1926

Inventor
Leopold Mambourg.
By Frank Fraser,
Attorney

Patented May 20, 1930

1,759,235

UNITED STATES PATENT OFFICE

LEOPOLD MAMBOURG, OF LANCASTER, OHIO, ASSIGNOR TO LIBBEY-OWENS GLASS COMPANY, OF TOLEDO, OHIO, A CORPORATION OF OHIO

SHEET-GLASS APPARATUS

Application filed September 20, 1926. Serial No. 136,459.

The present invention relates to sheet glass apparatus, and has particular reference to the continuous production of sheet glass.

An important object of the invention is to provide in sheet glass apparatus a draw pot containing a mass of molten glass from which a sheet can be continuously produced, and means arranged above the molten glass, in said pot, for protecting the same from the atmosphere.

A further object of the invention is to provide in sheet glass apparatus a draw pot which may be continuously replenished with molten glass from a tank furnace, and including means for separating the gases above the glass in the draw pot from the gases above the glass in said tank furnace.

A further object of the invention is to provide in an apparatus of this nature a draw pot containing a mass of molten glass from which a sheet may be drawn, and including hood means arranged above the draw pot for protecting the surface of the molten glass, from which the sheet is drawn, from the atmosphere.

A still further object of the invention is to provide in sheet glass apparatus including a draw pot containing a mass of molten glass, from which a sheet may be drawn, hood means arranged above the surface of said glass adapted to protect the same from the atmosphere, and including adjustable means for protecting the sheet from the atmosphere during its formative period.

Still another and important object is to provide a draw pot for use in sheet glass apparatus, the inner surface of the bottom of which being curved at its closed end to prevent the accumulation of stagnant glass, the sheet of glass being produced from the molten mass in said pot being so drawn that the base thereof is arranged relatively close to the closed end of said pot.

Other objects and advantages of the invention will become more apparent during the course of the following description.

Figure 1:
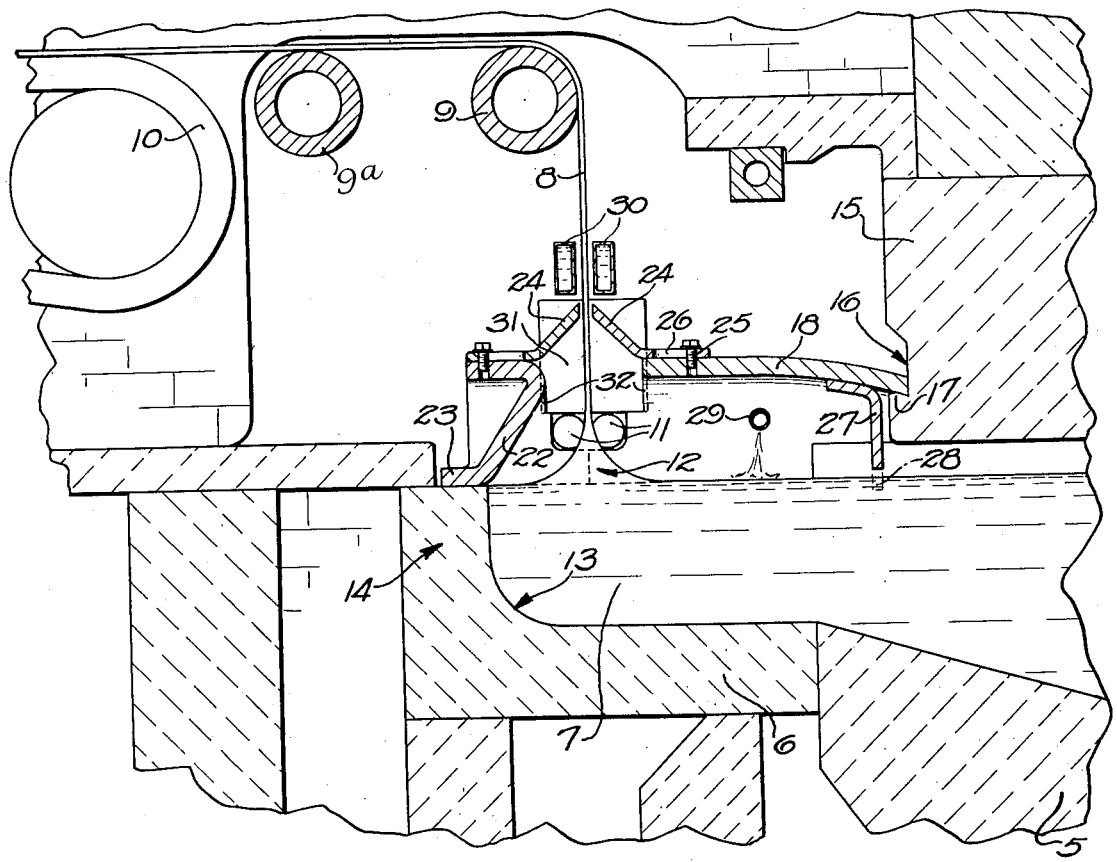
Figure 2:
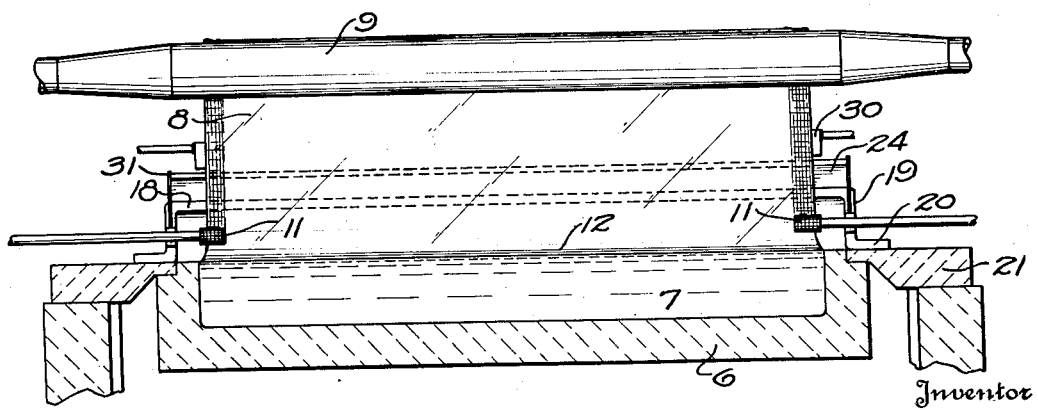

In the drawings wherein like numerals are employed to designate like parts throughout the same, Fig. 1 is a vertical longitudinal section through a portion of a sheet glass apparatus illustrating my invention in use, and Fig. 2 is a transverse section through a draw pot showing the invention in use.

The present invention relates more particularly to a continuous system wherein a sheet may be continuously drawn from a mass of molten glass contained in a suitable draw pot. Heretofore, in this type of apparatus it has been customary to expose a considerable portion of the surface of the molten glass from which the sheet is drawn to the atmosphere. I have found in actual practice that conditions can be disturbed, and difficulty had with the production of a high quality of sheet, by the mere opening or closing of a door or window in the building in which the machine is located. It is an aim, therefore, in the present invention to provide an apparatus wherein desirable conditions may be set up and maintained in a manner that the molten glass and sheet are practically free from changes due to atmospheric changes.

In the drawings, the numeral 5 designates a tank furnace having associated therewith a draw pot arranged in open communication with the furnace, the pot being supplied with molten glass 7. A sheet 8 may be continuously drawn from the molten mass 7, preferably in a vertical plane initially, and then deflected over a suitable member 9 so that it may be passed in a horizontal plane over a suitable drawing and flattening table 10 and on through an annealing leer, not shown. The roll 9ª is interposed between the roll 9 and the drawing means 10. The roll 9ª is positively driven and assists in drawing the sheet 8 from the mass of molten glass 7. Suitable width maintaining devices 11 may be used to prevent narrowing of the sheet. The means 11 are preferably arranged near the base 12 of the sheet.

In carrying out my invention, the bottom of the pot 6 is provided with the curved surface 13 so that there will be no tendency for an accumulation of glass at this end of the pot. The base 12 of the sheet is preferably arranged relatively close to the end wall 14 of the pot. The side of the sheet adjacent the closed end 14 of the pot will be supplied from glass passing under the sheet. As the base is arranged close to the wall 14, there will be a continuous movement of glass preventing an accumulation of stagnant glass. Stagnant glass becomes devitrified, in time forming what is known in the art as dog metal. At frequent intervals when this dog metal forms, it is necessary to stop forming a sheet and boil out this devitrified glass, causing a loss of time and production. By forming the curved surface 13 and shortening the pot, the tendency toward the formation of dog metal is reduced to a minimum.

The numeral 15 designates a jack arch arranged substantially at the juncture of the furnace 5 and pot 6. The jack arch 15 is provided with a recess 16 extending transversely of the pot to form a shoulder 17 upon which may be supported one end of a cover tile or hood 18. The hood 18, as shown in Fig. 2, is provided with the side walls 19 and extensions 20 supported upon the slabs 21. Suitable openings are provided in the walls 19 to permit operation of the edge engaging means 11.

On the opposite side of the sheet 8 is a second hood 22 provided with the extensions 23 so that the hood may be supported upon the end of the pot. Adjustably associated with the hoods 18 and 22 are preferably metallic plates 24 which may be shaped as illustrated, adjustment being had by means of the bolts 25 operating through the slots 26.

Depending from the hood 18 is a baffle wall 27 which may be dipped into the glass as indicated by the dotted lines 28, or short enough to just clear the surface of the molten glass as illustrated in heavy lines.

It has been common practice heretofore to permit the gases above the glass in the draw pot to mingle with or be a part of the gases above the glass in the tank furnace. Difficulty has been experienced with this arrangement because it is practically impossible to set up one condition in the melting end without disturbing the condition desired in the draw pot, or vice-versa.

By placing the baffle wall 27 substantially as illustrated, it is possible to set up any desired condition on either side of the wall without one condition interfering with the other. Suitable burners or the like 29 may be employed under the hood 18 as illustrated.

The hoods are provided to protect the surface of the molten glass 7 from the atmosphere, while the adjustable plates 24 protect the base of the sheet and the sheet proper from the atmosphere during its formative period. Of course, the plates 24 can be adjusted to take care of the thickness of the sheet being produced. In some instances, it may be desirable to position heat absorbing members 30 which comprise substantially rectangular bodies through which a suitable fluid may be circulated.

To enable the operator to inspect the sheet being produced, windows 31 may be arranged at the ends of the hoods and preferably in alignment with the sheet, the windows being movable in the slots 32.

With the construction hereinabove described, a sheet of glass may be continuously drawn from the surface of a mass of molten glass. The molten glass from which the sheet is drawn is preferably contained in a draw pot arranged in open communication with a tank furnace. To separate the gases above the molten glass in the draw pot from the gases in the tank furnace, a baffle plate is provided. As has been stated, the temperatures in the furnace and draw pot can be independently controlled, thus enabling the sheet operator to maintain any desired temperature at his end, while the melting end can be controlled without thought of the sheet end. This advantage will be readily apparent to those versed in the art.

In addition to separating these two portions of the furnace, the surface of the glass in the draw pot and the base of the sheet are protected from the atmosphere which also helps the operator to maintain a desirable working condition.

The adjustable plates are preferably positioned in a manner that the sheet is free from contact with the atmosphere until said sheet has become practically set. After the sheet has become substantially set it is less subject to the influence of the atmosphere than during its formative period.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a mass of molten glass, means for drawing a sheet therefrom, a roll over which the sheet is deflected into a horizontal plane, a hood arranged over the receptacle and adapted to protect the sheet from the atmosphere during its formative period, and heat absorbing means arranged between the hood and said roll.

2. In sheet glass apparatus, a receptacle containing a mass of molten glass, means for drawing a sheet therefrom, a roll over which the sheet is deflected into a horizontal plane, a hood arranged over the receptacle and adapted to protect the sheet from the atmosphere during its formative period, and heat absorbing means arranged on both sides of the sheet and mounted between the hood and said roll.

3. In sheet glass apparatus, a receptacle containing a mass of molten glass, means for drawing a sheet therefrom, a roll over which the sheet is deflected into a horizontal plane, a hood arranged over the receptacle and adapted to protect the sheet from the atmosphere during its formative period, heat absorbing means arranged between the hood and said roll, and a depending baffle wall carried by one end of the said hood.

4. In sheet glass apparatus, a receptacle containing a mass of molten glass, means for drawing a sheet therefrom, a roll over which the sheet is deflected into a horizontal plane, a hood arranged over the receptacle and adapted to protect the sheet from the atmosphere during its formative period, heat absorbing means arranged on both sides of the sheet and mounted between the hood and said roll, and a depending baffle wall carried by one end of said hood.

5. In sheet glass apparatus, a receptacle containing a mass of molten glass, means for drawing a sheet therefrom, a roll over which the sheet is deflected into a horizontal plane, a hood arranged over the receptacle and adapted to protect the sheet from the atmosphere during its formative period, and heat absorbing means arranged between the hood and said roll, said hood having portions resting on the receptacle.

6. In sheet glass apparatus, a receptacle containing a mass of molten glass, means for drawing a sheet therefrom including a roll over which the sheet is drawn and deflected into a horizontal plane, a hood having adjustable portions arranged over the mass of molten glass and adapted to protect the sheet from the atmosphere during its formative period, said adjustable portions controlling the exposure of the sheet during its formative period to the atmosphere, and heat absorbing means arranged on both sides of the sheet and mounted between the adjustable portions of said hood and the roll over which the sheet is deflected.

7. In sheet glass apparatus, a receptacle containing a mass of molten glass, means for drawing a sheet therefrom including a roll over which the sheet is drawn and deflected into a horizontal plane, a hood having adjustable portions arranged over the mass of molten glass and adapted to protect the sheet from the atmosphere during its formative period, said adjustable portions controlling the exposure of the sheet during its formative period to the atmosphere, heat absorbing means arranged on both sides of the sheet and mounted between the adjustable portions of said hood and the roll over which the sheet is deflected, and means arranged within said hood for controlling the temperature of the glass thereunder.

8. In sheet glass apparatus, a receptacle containing a mass of molten glass, means for drawing a sheet therefrom including a roll over which the sheet is drawn and deflected into a horizontal plane, a hood having adjustable portions arranged over the mass of molten glass and adapted to protect the sheet from the atmosphere during its formative period, said adjustable portions controlling the exposure of the sheet during its formative period to the atmosphere, heat absorbing means arranged on both sides of the sheet and mounted between the adjustable portions of said hood and the roll over which the sheet is deflected, and transparent means arranged in said hood to permit inspection of the sheet during its formative period.

9. In sheet glass apparatus, a furnace containing a mass of molten glass, a draw-pot in open communication therewith and adapted to receive molten glass therefrom, a cross member arranged transversely of the flow of glass and mounted substantially at the juncture of the furnace with the draw-pot, a hood arranged over the glass in the draw-pot and having a portion engageable with said cross member whereby to assist in supporting the hood, and a baffle wall depending from said hood and arranged in close proximity to the cross member.

10. In sheet glass apparatus, a furnace containing a mass of molten glass, a draw-pot in open communication therewith and adapted to receive molten glass therefrom, a cross member arranged transversely of the flow of glass and mounted substantially at the juncture of the furnace with the draw-pot, a hood arranged over the glass in the draw-pot and having a portion engageable with said cross member whereby to assist in supporting the hood, a baffle wall depending from said hood and arranged in close proximity to the cross member, means for drawing a sheet from the mass of molten glass, and heat absorbing means arranged directly above the shield and in proximity to the sheet being drawn.

11. The method of forming sheet glass which comprises drawing a sheet upwardly by a surface moving in contact with the sheet and disposed above the level of a pool of molten glass, maintaining the surface temperature of the sheet of glass at a point above said pool, and cooling the surface of the glass at a point between said moving surface and the first-named point.

12. The method of forming sheet glass which comprises drawing a sheet in contact with a rotating surface disposed above the level of a pool of glass, maintaining the surface temperature of the sheet of glass at a point above said pool, and cooling the surface of the glass at a point between said rotating surface and the first-named point.

Signed at Lancaster, in the county of Fairfield and State of Ohio, this 11th day of September, 1926.

LEOPOLD MAMBOURG.